United States Patent [19]

Koscinski et al.

[11] Patent Number: 5,125,280
[45] Date of Patent: Jun. 30, 1992

[54] JACK ASSEMBLY

[75] Inventors: Daniel P. Koscinski, Garfield Heights; Glen D. Michalske, North Ridgeville; George S. Kiester, Maple Heights, all of Ohio

[73] Assignee: Nook Industries Inc., Cleveland, Ohio

[21] Appl. No.: 121,163

[22] Filed: Nov. 16, 1987

[51] Int. Cl.⁵ .................... F16H 27/02; F16H 29/02
[52] U.S. Cl. ........................... 74/89.15; 74/424.8 R
[58] Field of Search ............ 74/89.15, 424.8 R; 116/204

[56] References Cited

U.S. PATENT DOCUMENTS

| | | | |
|---|---|---|---|
| 3,161,074 | 12/1964 | Korthaus et al. | 74/424.8 R |
| 4,736,674 | 4/1988 | Stoll | 92/13.5 |
| 4,757,300 | 7/1988 | Sebalos | 116/204 |

FOREIGN PATENT DOCUMENTS

| | | | |
|---|---|---|---|
| 253735 | 1/1988 | European Pat. Off. | 74/424.8 R |
| 61-171953 | 8/1986 | Japan | 74/424.8 R |

*Primary Examiner*—Allan D. Herrmann
*Assistant Examiner*—Julie Krolikowski
*Attorney, Agent, or Firm*—Renner, Otto, Boisselle & Sklar

[57] ABSTRACT

A jack assembly of the ball screw or machine screw type includes a screw, a nut in driving engagement with the screw whereby rotation of the nut causes the nut or screw to move axially. A nut drive housing in which the nut rotates includes a worm gear transmission which may be driven directly or indirectly by an electric motor. The screw projecting through the nut is enclosed by a screw stem cover mounted on the housing which environmentally protects the screw. The cover and screw move axially relative to each other. In a preferred embodiment, the screw stem cover is made of plastic and is provided with slots extending axially in which are adjustably positioned magnetic reed switches. The switches may be clamped in place by a sleeve type clamp or the exterior of the cover may be flattened in the area of the slot for direct mounting of the switch. The stem cover may also have a flattened area for mounting of the required terminal. The end of the screw is provided with an annular magnet held in place with non-magnetic materials to provide proper sinking of the magnet permitting little flux drain-off through the screw. The entire cover with the reed switches in place and connected to the terminal may be encapsulated by a heat shrink sleeve with access to the terminal provided by a flap which can be opened and resealed. Optionally, Hall effect or proximity sensors may be employed with or without the magnet in some applications for electronic control.

28 Claims, 6 Drawing Sheets

JACK ASSEMBLY

This invention relates generally as indicated to a jack assembly and more particularly to a jack assembly having built in, low cost position controls which have high repeatable accuracy and which are environmentally secure and corrosion resistant providing long service life for the jack assembly.

BACKGROUND OF THE INVENTION

In ball screw and machine screw jacks, such as sold by Nook Industries of Cleveland, Ohio under the trademark ACTIONJAC, rotary limit switches are commonly employed to control and regulate jack travel. Such rotary switches are mounted directly on the jacks and are worm gear operated and regulate jack travel by sensing the number of input shaft revolutions.

In such application rotary limit switches present a number of problems. A major problem is the cost. Another problem is bulk. Such rotary switches can be mounted in a number of positions but in each project substantially from the jack creating clearance problems in some installations. They of course also require a shaft drive connection. Rotary limit switches also are subject to wear, have a relatively short service life, and tend to drift as they wear, thus not providing highly reliable repeatability.

Mechanical pole arm actuated limit switches have many of the same problems, particularly when mounted on projecting brackets. Moreover, the screws of such jacks are usually sealed in a cover tube such that physical contact with the screw is not really feasible.

In such jacks the cover and screw are usually made of steel which are subject to magnetic flux making the use of low cost magnetic switches unreliable, without modification of the jack assembly. If low cost magnetic reed switches or Hall effect sensors could be employed with easy installation and adjustment and achieve reliable repeatability, a lower cost, more reliable jack assembly with longer service life can be obtained.

DETAILED DESCRIPTION OF THE PREFERRED EMBODIMENTS

Figure 1:
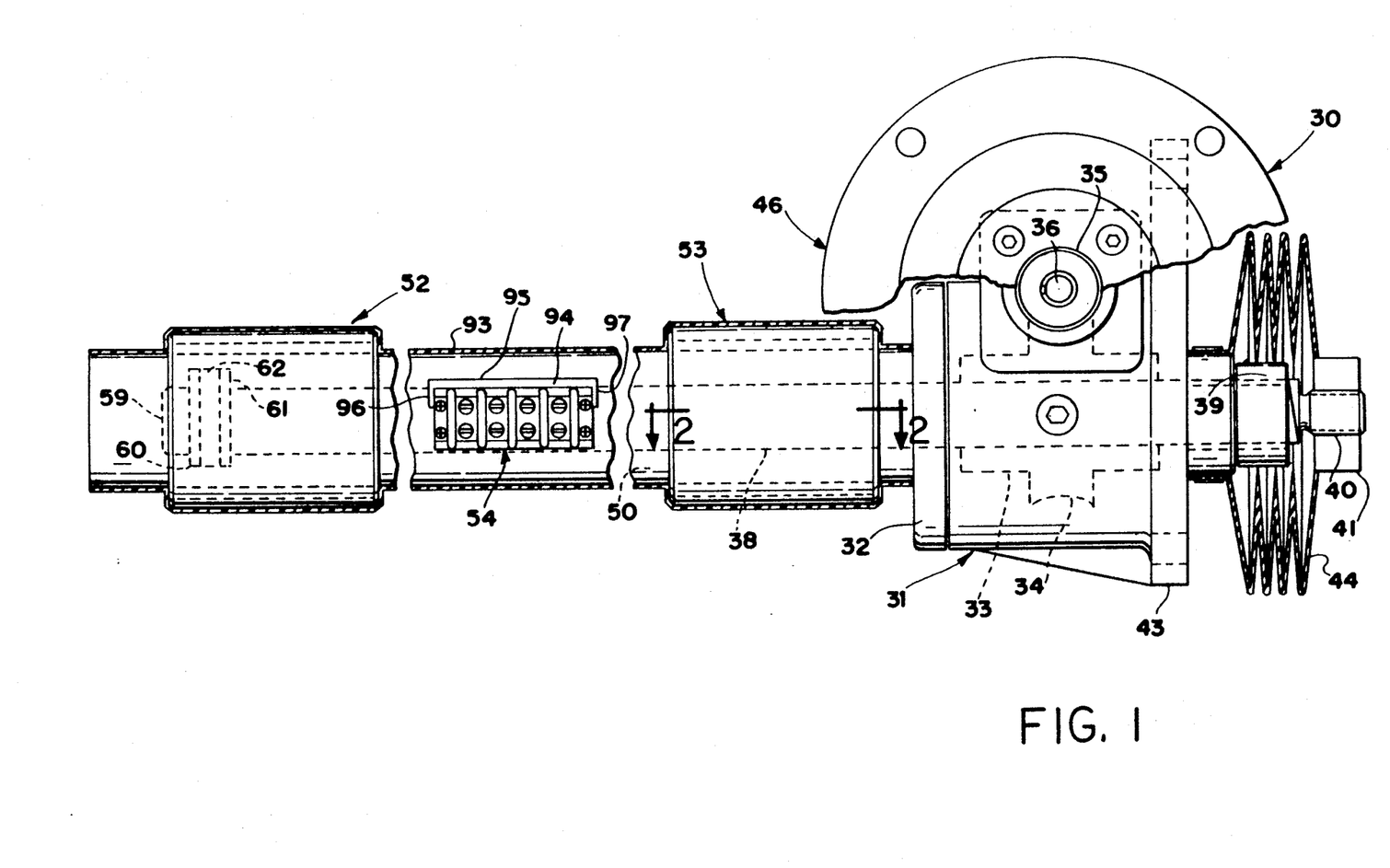
FIG. 1 is a side elevation partially broken away and in section illustrating a machine screw jack in accordance with the present invention.

Referring first to FIGS. 1-6, and initially to FIG. 1, there is illustrated a machine screw jack assembly 30 which includes a nut housing 31 which includes a cover 32 and in which is journalled nut 33 which includes a pinion 34 in mesh with worm gear 35 on worm shaft 36. The nut 33 is in mesh with screw 38 which projects from both ends of the nut housing. Operation of the jack rotates the nut 33 causing the nut or screw 38 to move axially. On one end, usually the upper end, the screw is provided with a stop 39 and may be threadedly connected as indicated at 40 to an element to be lifted or moved indicated at 41. The nut housing includes a mounting flange 43 by means of which the nut housing and thus the jack may be affixed to another element such as a frame, so that operation of the jack will move the element 41 with respect to such frame. The jack, as illustrated in FIG. 1, is shown in its closed or down position and a flexible boot seen at 44 may be employed to protect and seal the projecting screw as the element 41 moves away from and toward the nut housing. The nut housing may include a motor adapter so that worm shaft 36 may be driven directly by a motor. Where more than one jack is employed the worm shaft may be driven through an arrangement of shafts, couplings, gear boxes and a single motor remote from the jack.

In the illustrated machine screw jack, the screw does not rotate, being fixed to the element 41. The jack may, for example, have a worm gear ratio of 6 to 1 and the number of turns of the worm to move the screw one inch may be 24.

The opposite end of the screw projects into a screw stem cover indicated generally at 50 which is mounted on and projects from the cover 32 of the nut housing. Mounted on the stem cover are two limit switch assemblies seen at 52 and 53 as well as a terminal block 54. The limit switch assemblies are mounted generally at the opposite ends of the elongated stem cover, while the terminal block may be mounted midway between such switch assemblies.

Figures 2, 3, 4:
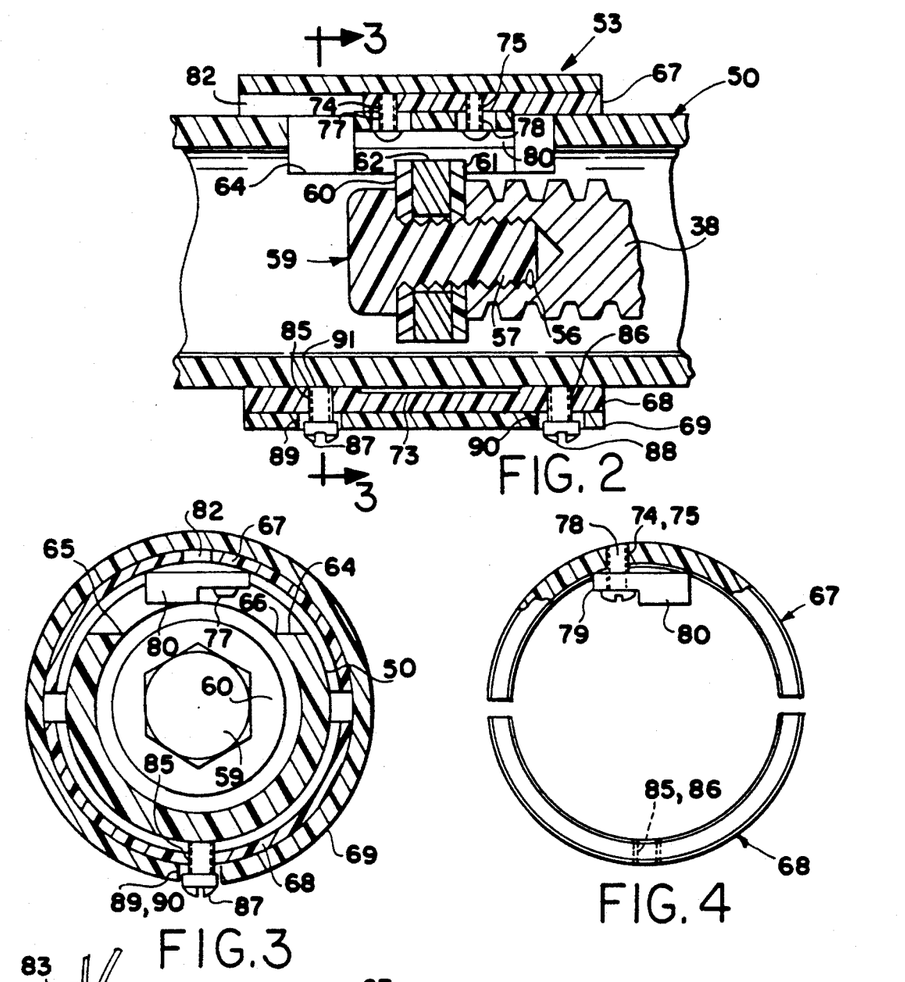
FIG. 2 is an enlarged fragmentary axial section through the screw stem cover taken substantially on the line 2—2 of FIG. 1.
FIG. 3 is a transverse section taken from the line 3—3 of FIG. 2.
FIG. 4 is an end elevation partially in section of the semi-circular switch mounts.
Figure 5:
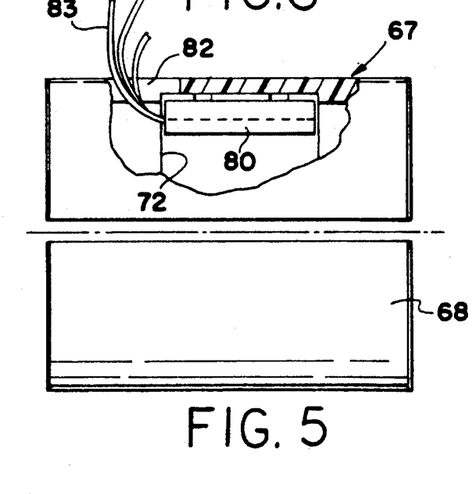
FIG. 5 is a side elevation of the switch mounts with one mount partially broken away and showing a magnetic reed switch in place.

Referring now additionally to FIGS. 2 and 3, it will be seen that the end of the metal screw 38 is provided with an axially extending blind tapped hole 56 in which the shank 57 of plastic bolt 59 is threaded. Captured between the head of the bolt and the end of the metal screw are plastic washers 60 and 61 with an annular magnet 62 therebetween. In this manner there is proper sinking of the magnet 62 with respect to the screw 38 permitting little flux drain off through the screw. Subsequently, as the contained end of the metal screw 38 progresses towards one of the limit switches 52 or 53, the proximate limit switch will electromagnetically sense the presence of the magnet 62 and operate to stop or reverse the drive mechanism and progress of the screw.

The stem cover 50 at each of the switch mounts or assemblies 52 and 53 is chordally cut away as indicated at 64 to provide a rectangular cylindrical opening through the stem cover wall from the circumference points 65 and 66 on the I.D. of the stem cover.

Surrounding the stem cover at the opening is a switch mount assembly which comprises opposed semi-circular generally similar switch mounts 67 and 68 and a surrounding circular sleeve 69. Both semi-circular switch mounts have the same I.D. as the O.D. of the stem cover, are slightly less than a half circle, and are provided with an inner circular center recess as seen at 72 and 73, respectively. The switch mount 67 is provided with a pair of tapped holes 74 and 75 which are within such recess 72 but which are parallel to but offset from the radius through the center of the switch mount. Such tapped holes are employed with threaded fasteners 77 and 78, respectively which extend through axially elongated slots in offset flange 79 of reed switch 80. The reed switch 80 is thus mounted so that its radially inward projection is sustantially flush with the I.D. of the stem cover 50.

Figure 6:
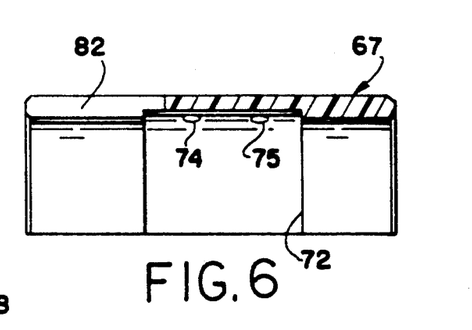
FIG. 6 is an axial section of the one mount without the switch in place.

The switch mount 67 is provided with a blind axial center slot 82 which provides a passage for the wires 83 to exit the switch mount assembly over the O.D. of the stem cover 50.

As indicated more clearly in FIGS. 2, 3 and 4, the opposing switch mount 68 is provided with tapped holes 85 and 86 which are axially aligned and in the center of the switch mount. These holes receive jack screws 87 and 88, the heads of which fit through slightly enlarged holes 89 and 90 in sleeve 69. As the jack screws are tightened, the flat ends thereof bear against the O.D. of the stem cover forcing the switch mount 68 against the inside of the sleeve in effect pulling the sleeve downwardly as seen in FIGS. 2 and 3 firmly clamping the other switch mount 67 in place. With the sleeve-clamp assembly illustrated the reed switch 80 may not only be firmly secured in place, but also may readily be adjusted axially of the opening in the stem cover. This is in addition to any axial adjustment obtained by the elongated slots in the flange 78.

Figures 8, 9, 10, 11:
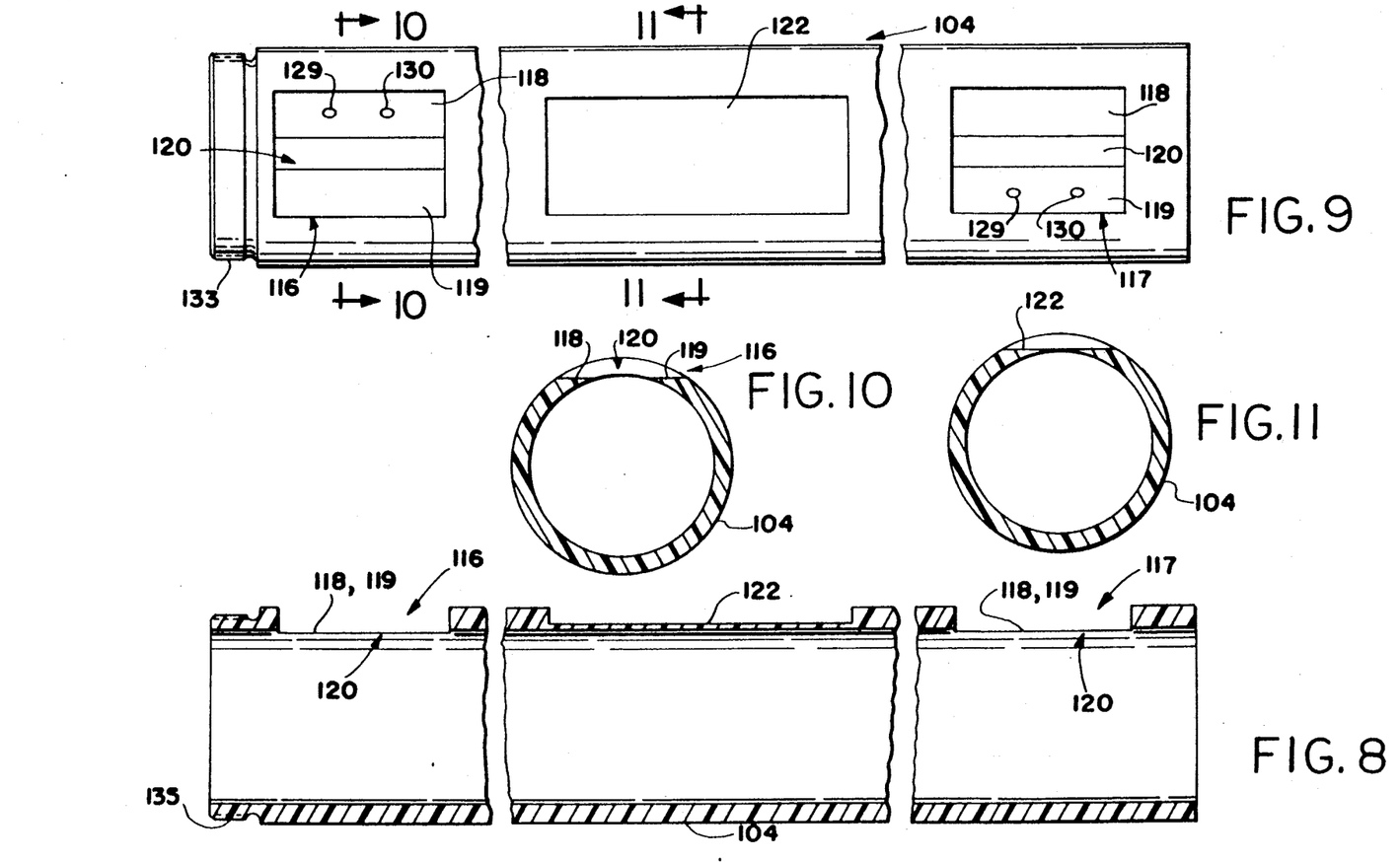
FIG. 8 is an enlarged broken axial section of a stem cover of the type seen in FIG. 7.
FIG. 9 is a broken plan view of the stem cover of FIG. 8 as seen from the top of FIG. 8.
FIG. 10 is a tranverse section seen from the line 10—10 of FIG. 9.
FIG. 11 is a transverse section as seen from the line 11—11 of FIG. 9.

Referring again to FIG. 1, it will be seen that the terminal block 54 mounted halfway between the switch mounts 52 and 53 may be mounted on a flat surface on the exterior of the stem cover, such surface being essentially the same as seen in FIG. 11 and being formed by a flat or chord formed in the outside of the stem cover. After the switch assemblies are properly positioned and secured in place and wired to the terminal block, a plastic tubular sleeve is then positioned over the entire length of the stem cover and then heat shrunk in place as indicated at 93. The heat shrinking of the tube causes it closely to conform to the slightly radially projecting switch mounts and if access is required to the terminal block a small flap may be formed in the heat shrink cover as indicated at 94. The flap may be formed by cutting the cover along the axial line 95 and the two circumferential lines indicated at each end at 96 and 97. By folding the flap back access may be obtained to the terminal block. After the required access is obtained, the flap may be repositioned and sealed in place. The sealed heat shrink sleeve not only contains the grease normally found in the stem cover, but also protects the screw with in the stem cover from environmental contaminants.

Figure 7:
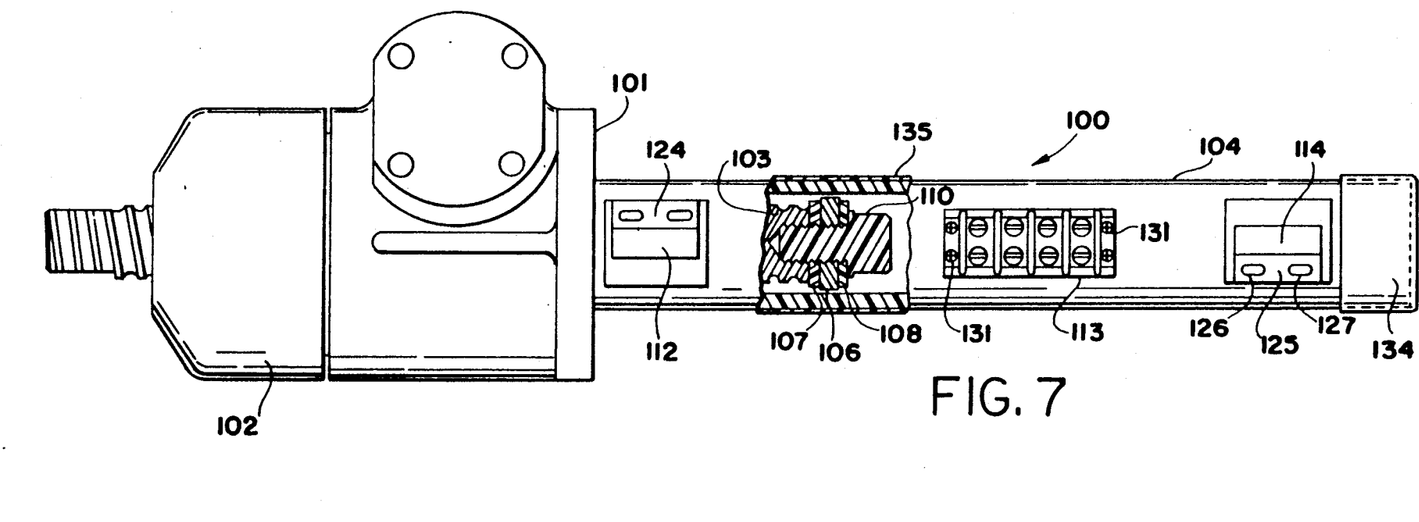
FIG. 7 is a side elevation of a ball screw jack assembly utilizing another form of plastic stem cover and switch mounting.

Referring now to FIG. 7, there is illustrated a ball screw jack 100 which includes a worm gear housing 101, part of which includes the housing 102 for the ball nut. The screw 103 projects axially from both ends of the housing and moves axially within stem cover 104 connected to the housing 101. Operation of the jack rotates the ball nut causing the relative axial movement of the ball nut or screw 103.

Again, the end of the screw is provided with an annular magnet 106 secured between the plastic washers 107 and 108 captured by the head of fastener 110 threaded in the blind tapped hole in the end of the screw. As illustrated, the stem cover 104 is plastic and the magnet 106 is surrounded by plastic, thus properly sinking the magnet and allowing little flux drain off.

Mounted on the exterior of the stem cover are magnetic reed switch 112, terminal block 113, and magnetic reed switch 114. The manner in which the two reed switches and terminal block are mounted on the stem cover is more clearly seen in FIGS. 8-11. As indicated at 116 and 117, the tubular stem cover is chordally cut away to provide at each location two coplanar flat surfaces 118 and 119 with a rectangular opening therebetween through the wall of the stem cover as seen at 120. The opening is formed because the plane of the surfaces 118 and 119 is slightly radially inwardly of the radius of the I.D. of the stem cover.

A similar planar relief at 122 is provided for the terminal block 113, but the plane of the relief is beyond the radius of the I.D. of the stem cover. In this manner no hole through the wall of the stem cover is formed. The planar reliefs 116, 117 and 122 are all parallel to each other and normal to a plane through the axis of the stem cover with the relief 122 being radially outwardly offset from the plane of the surfaces 118 and 119.

As indicated in FIG. 7, the reed switches 112 and 114 include a lateral mounting flange as seen at 124 and 125 which are provided with axially elongated mounting slots seen at 126 and 127. Such mounting flanges may preferably be simply adhesively secured to the surfaces 118 and 119 of the reliefs 116 and 117, respectively, and the reed switches may be radially adjustably positioned by the use of shims. Alternatively, the reed switches may be secured to the stem cover by fasteners extending through the axially elongated slots and into relatively shallow tapped holes seen at 129 and 130. The use of the fasteners permits limited axial adjustment to the extent of the elongation of the slots. The terminal 113 may also be adhesively secured to the surface 122 or alternatively secured by the fasteners indicated at 131.

One end of the stem cover is provided with external threads 133 as seen in FIG. 8 to mount the stem cover on the housing 101, while the opposite end is provided with a cap 134 seen in FIG. 7. Once the reed switches and the terminal blocks are in place and connected, a shrink wrap tubular sleeve 135 also seen in FIG. 7 may be provided completely surrounding and sealing the stem cover.

Referring now to FIGS. 12-15, there is illustrated a machine screw jack assembly shown generally at 136 which includes nut drive housing 137 and screw 138 connected to load 139 at one end, and at the opposite end projecting into stem cover 140. The stem cover is tubular plastic and is secured to the housing 137 and surrounds the projecting screw which moves axially therewithin. The end of the screw is provided with annular magnet 142 which is positioned between plastic washers 143 and 144 each clamped against the end of the screw by plastic bolt 145.

Figure 12:
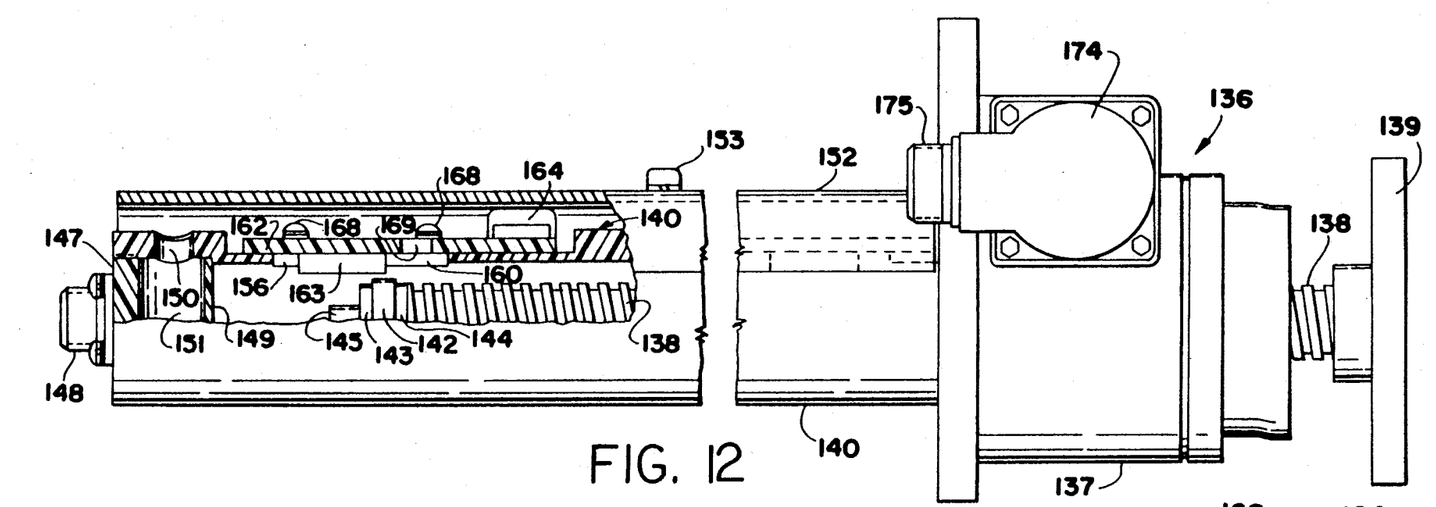
FIG. 12 is a side elevation of a machine screw jack assembly utilizing a wire cover with a stem cover cap and connector mounted thereon.

The end of the stem cover is provided with a stem cap 147 to which is secured electrical connector 148. The stem cover is also provided with a plug or wall 149 and between the plug and stem cap there is provided a radial somewhat enlarged opening 150 in the stem cover so that wiring may pass from the connector through the chamber 151 formed between the cap 147 and plug 149 to exit the hole 150 to enter the interior of wire cover 152 which extends the length of the stem cover. The wire cover may be secured to the stem cover by fasteners 153.

Figures 13, 14, 15:
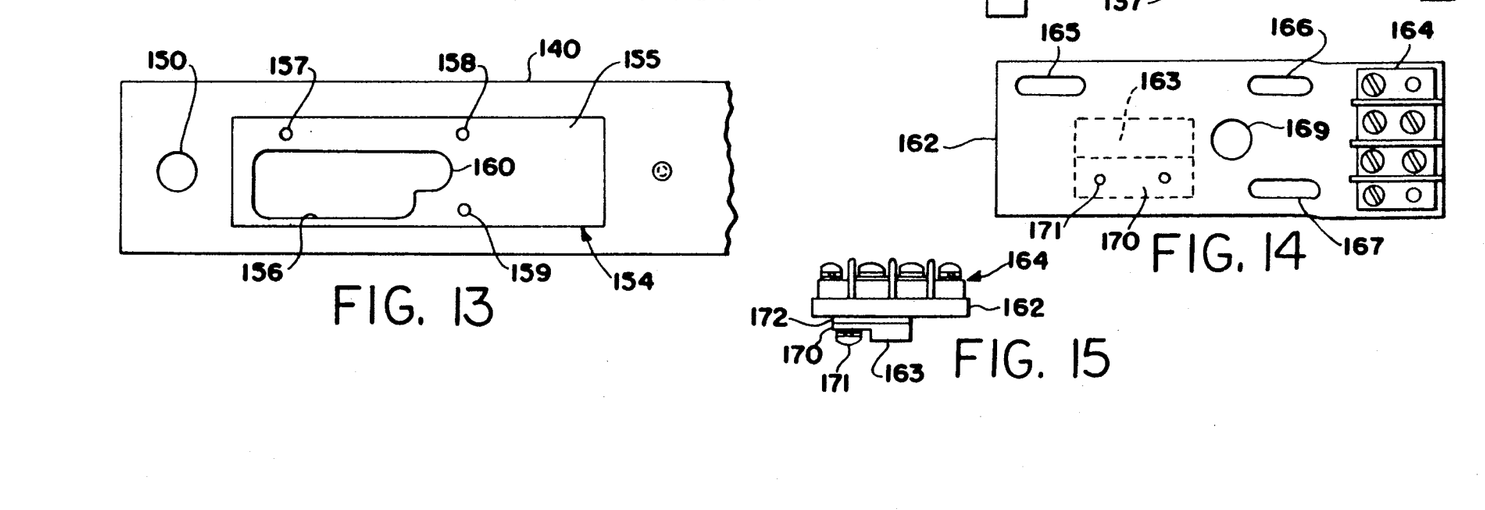
FIG. 13 is an enlarged plan view of the switch mounting surface on the stem cover as seen from the top of FIG. 12.
FIG. 14 is an enlarged top plan view of the switch assembly seen in FIG. 12.
FIG. 15 is an end elevation of the switch assembly as seen from the right hand end of FIG. 14.

As seen in FIG. 13, the stem cover 140 is chordally cut away at each end as indicated at 154 to form a planar mounting surface 155. Positioned in such mounting surface is hole 156, such hole extending completely through the wall of the stem cover. Also positioned in such mounting surface are shallow tapped blind holes, 157, 158 and 159. The hole 156 has the profile configuration seen in FIG. 13 which is generally rectangular but with rounded corners and an inwardly extending projection 160 which is offset from the longitudinal axis of the hole but aligned with the center of the stem cover. The mounting surface and hole at the opposite end of the stem cover appears as an inverted mirror image of what is seen in FIG. 13.

Referring now to FIGS. 14 and 15, there is illustrated a switch assembly which includes a rectangular switch plate 162, a reed switch 163 and a terminal block 164. The plate is provided with three elongated fastener receiving slots 165, 166 and 167 adapted to receive fasteners 168 threaded in the holes 157, 158 and 159, respectively. The plate 162 also includes a circular wire aperture 169 which will generally align with the projection 160 of the hole 156 to permit wires to pass from the switch 163 on the interior of the plate to the terminal block on the exterior. the reed switch 163 is provided with a lateral flange 170 through which fasteners 171 extend and one or more shims indicated at 172 may be provided for radial adjustment of the switch 163.

The machine screw jack assembly of FIGS. 12-15 may be provided with an encoder shown generally at 174 also provided with a wire connector 175. The encoder is mounted on one end of the worn shaft and is driven thereby. The magnetically operated reed switches together with the encoder provide a sophisticated electrical control system for the jack assembly.

Referring now to FIGS. 16-20, there is illustrated a ball screw jack assembly in accordance with the present invention shown generally at 178. The assembly 178 includes a ball screw 179 which is moved axially by ball nut 180 which is driven by pinion 181 in turn driven by worm 182 secured to worm shaft 183. The ball nut and pinion are journalled in two part housing 184. One end of the screw is connected to a load as indicated by the plate 185 while the opposite end has secured thereto a square nut or block 186 which fairly closely fits within the square interior 187 of stem cover 188. As seen more clearly in FIG. 17, the stem cover is open at one end and provided with an external flange 190. Fasteners 191 extending through such flange secure the stem cover to the nut housing. The opposite end of the stem cover is closed by end wall 192. The stem cover cooperates with the nut 186 to keep the screw from rotating and also protects the screw as it projects from the housing 184.

Figure 17:
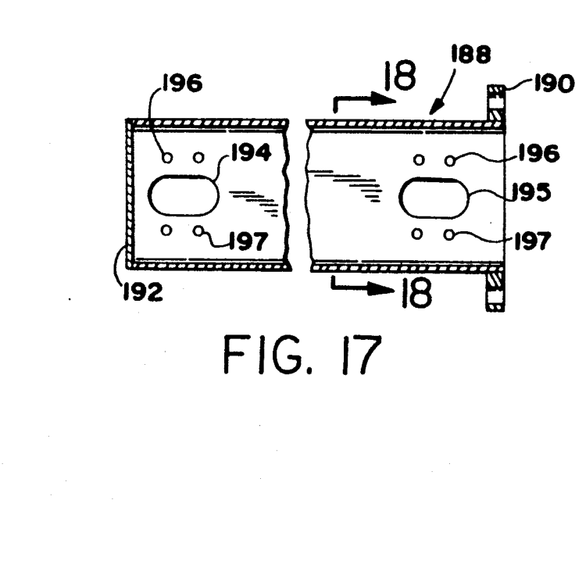
FIG. 17 is a reduced broken axial section of the stem cover of FIG. 16.
Figure 18:
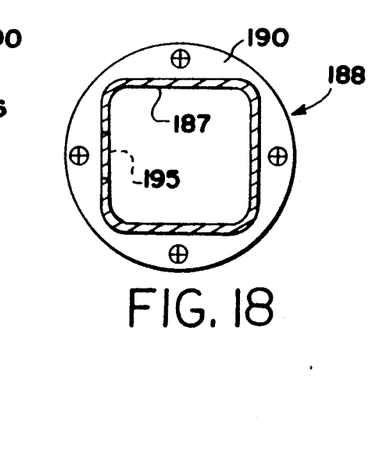
FIG. 18 is a transverse section of the stem cover as seen from the line 18—18 of FIG. 17.
Figures 19, 20:
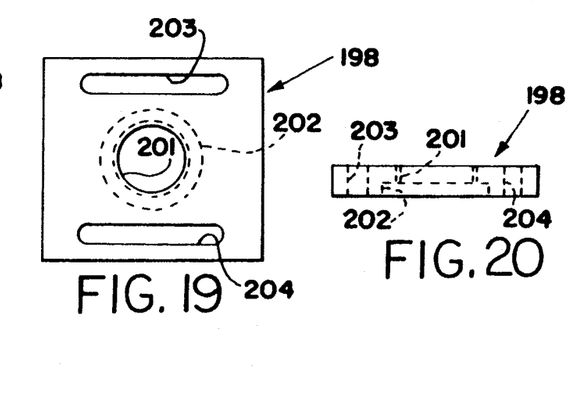
FIG. 19 is an enlarged plan view of the switch mount seen in FIG. 16.
FIG. 20 is an end elevation of the mount as seen from the right hand end of FIG. 19.

One of the walls of the stem cover is provided at each end with elongated openings as seen at 194 and 195, each of which are provided on opposite sides with paired tapped holes 196 and 197. Secured to the exterior of such wall of the stem cover are switch mounts 198 and 199, such switch mounts being shown in more detail in FIGS. 19 and 20. The switch mounts are in the form of square plates which include a center tapped hole 201, the underside of which is circularly relieved as indicated at 202. On opposite sides of the center tapped hole there is provided elongated mounting slots 203 and 204 which are adapted to receive headed fasteners secured in the tapped holes 196 and 197. In this manner the switch mounts may adjustably be secured to the exterior of the stem cover to the extent permitted by the elongation of the slots 203 and 204. Secured in the tapped holes 201 of each switch mount are tubular proximity switches 206 and 207. Such switches are externally threaded and may be adjusted axially (normal to the axis of screw 179) and locked in such axial adjustment by lock nuts 208 and 209, respectively. The relieved portion 202 of the switch mounts enables the sensing field of the tip 210 of each proximity switch properly to be adjusted to sense accurately the presence of the nut or block 186 at the end of the screw 179, or the absence of the nut. When one of the proximity switches electromagnetically senses the presence of the nut or block 186, the switch will act to stop or reverse the drive mechanism and progress of the ball screw 179.

Figure 16:
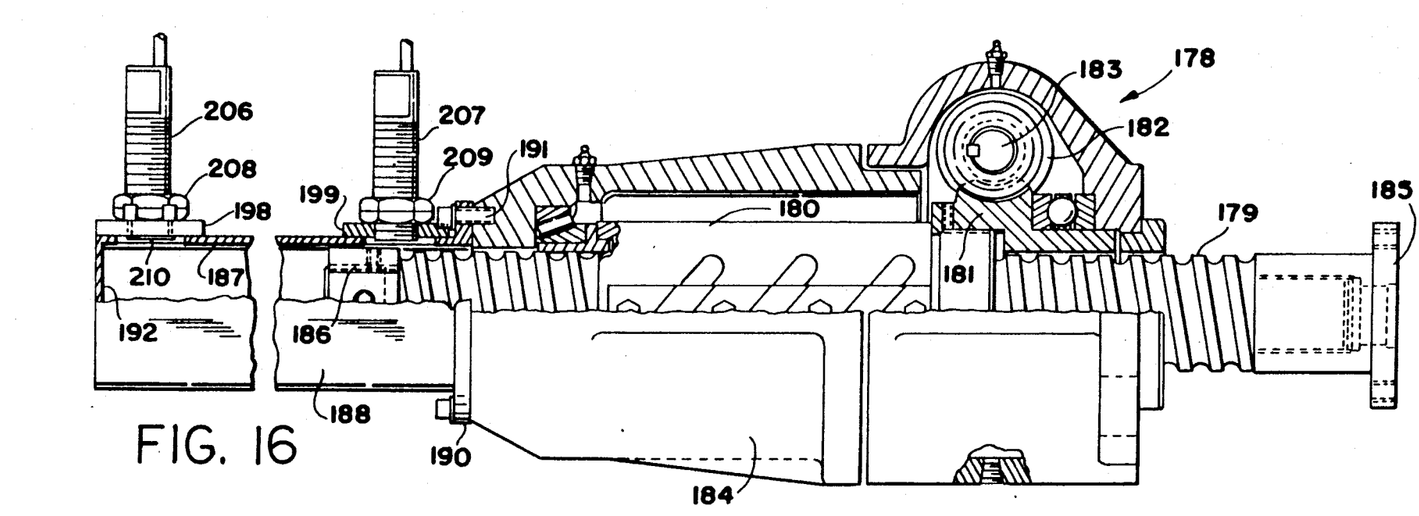
FIG. 16 is a side elevation broken away and in section of a ball screw jack assembly utilizing proximity switches mounted on a square stem cover sensing the presence and absence of the end of the screw.

In the magnetic switch embodiments of the present invention, such switches may be of the type obtained from Hamlin, Inc. of Lake Mills, Wis. Proximity switches such as seen in FIG. 16 may be obtained from NAMCO Controls of Cleveland, Ohio. The magnets employed may be ceramic or metal and the materials of the parts used to sink the magnets with respect to the screw may be plastic such as nylon. The stem covers may preferably be plastic or nonferrous materials, although in some instances metal may be employed, while the shrink wrap tubing may be polyethylene.

We claim:

1. A jack assembly comprising a screw, a nut in driving engagement with said screw whereby rotation of said nut causes said nut or screw to move axially, a nut drive housing in which said nut rotates, a screw stem cover projecting from said housing and in which an end of said screw is positioned, said cover and screw end moving relative to each other upon rotation of said nut, power drive means for said nut, and a plurality of magnetic reed switches mounted on said stem cover operative electromagnetically to sense without contact the end of said screw to stop or reverse said drive means, said switches being radially and axially adjustable with respect to the axis of said screw, a permanent magnet mounted on the end of said screw operative to open and close said switches as the magnet or switches move past each other, wherein said magnet is in the form of a ring, and wherein said screw is formed of ferrous metal and said magnet is magnetically isolated from said screw.

2. A jack assembly as set forth in claim 1 inlcuding a plastic bolt and washer assembly securing said magnet to the end of said screw.

3. A jack assembly as set forth in claim 2 including a nonmagnetic washer between said magnet and the end of said screw.

4. A jack assembly as set forth in claim 3 including a terminal block on the exterior of said stem cover between said switches, and a plastic shrink wrap enclosing said stem cover, switches and terminal block.

5. A jack assembly as set forth in claim 3 including an axially elongated opening in said stem cover at each switch, and means mounting said switches on the exterior of said stem cover to project through said openings.

6. A jack assembly as set forth in claim 5 wherein said means mounting said switches on the exterior of said stem cover comprises a semi-circular mount with the switch on the interior thereof, and a sleeve surrounding said mount and clamping said mount to said stem cover.

7. A jack assembly as set forth in claim 6 including a semi-cylindrical clamp diametrically opposite said mount, and clamp screws extending through said sleeve and threaded into said clamp to bear against the interior of said sleeve opposite said mount to draw said sleeve against said mount.

8. A jack assembly as set forth in claim 6 wherein said semi-circular mount includes an axially extending slot through which wires pass from the exterior of the stem cover to the switch.

9. A jack assembly as set forth in claim 5 wherein said stem cover is plastic.

10. A jack assembly as set forth in claim 9 wherein each opening is formed by a chordal surface on the exterior of said stem cover, said elongated opening being formed by the intersection of the interior of said stem and the chordal surface, and means mounting said switch on said chordal surface to project into said opening.

11. A jack assembly as set forth in claim 10 wherein said switch is mounted on said surface by adhesive.

12. A jack assembly as set forth in claim 10 wherein said switch is mounted on said surface by fasteners extending through axially elongated slots.

13. A jack assembly as set forth in claim 10 including shim means radially to adjust the position of said switch.

14. A jack assembly as set forth in claim 10 including a chordal surface on said stem cover between said switches which is radially beyond the interior of said stem cover, and a terminal block for said switches mounted on said chordal surface:

15. A jack assembly comprising a screw, a nut in driving engagement with said screw whereby rotation of said nut causes said nut or screw to move axially, a nut drive housing in which said nut rotates, a screw stem cover projecting from said housing and in which an end of said screw is positioned, said cover and screw end moving relative to each other upon rotation of said nut, power drive means for said nut, and a plurality of externally threaded tubular proximity switches secured to said stem cover with axially adjustable switch mounts each having a tapped hole for receiving said switch thread whereby said switches may be radially adjusted by rotating the switch, said switches being operative electomagnetically to sense without contact the end of said screw to stop or reverse said drive means.

16. A jack assembly as set forth in claim 15 including a lock nut on each switch operative to lock the switch in radially adjusted position on the switch mount.

17. A jack assembly as set forth in claim 16 wherein the interior of said switch mount is relieved around said tapped hole.

18. A jack assembly as set forth in claim 17 wherein said stem cover is rectangular in transverse section, and a block secured to the end of said screw having the same transverse section whereby rotation of said screw within said stem cover is precluded.

19. A jack assembly as set forth in claim 18 wherein such switches sense the presence or absence of said block.

20. A jack assembly comprising a screw, a nut in driving engagement with said screw whereby rotation of said nut causes said screw to move axially, a nut housing in which said nut rotates, a screw stem cover secured to an projecting from said housing in which the end of the screw opposite the load moves axially, power drive means for said nut, a plurality of magnetic reed switches mounted on said screw stem cover for electromagnetically sensing the position of said screw and for controlling said power drive means mounted on said screw cover, said magnetic reed switches being operated by a permanent magnet on the end of said screw, and wherein said permanent magnet is annular and is secured to the end of said screw with a non-magnetic fastener.

21. A jack assembly as set forth in claim 20 wherein said nonmagnetic fastener comprises a nonmagnetic bolt threaded into the end of the screw with nonmagnetic washers on each side thereof.

22. A jack assembly as set forth in claim 21 wherein said screw stem cover is nonmagnetic.

23. A jack assembly as set forth in claim 22 including means adjustably to position said magnetic reed switches both radially and axially of the screw.

24. A jack assembly as set forth in claim 23 wherein said stem cover is tubular and includes chordal exterior mounting surfaces for said magnetic reed switches.

25. A jack assembly as set forth in claim 24 wherein each chordal mounting surface includes a hole through the wall of the stem cover into which the magnetic reed switch projects.

26. A jack assembly as set forth in claim 25 wherein the plane of said surfaces is radially interior of the I.D. of the stem cover.

27. A jack assembly as set forth in claim 26 including an intermediate planar mounting surface between said magnetic reed switches for a terminal block, the plane of said intermediate mounting surface being radially beyond the I.D. of the stem cover.

28. A jack assembly as set forth in claim 27 including a plastic tube shrunk over said stem cover to encapsulate said switches and terminal block.

* * * * *